(12) United States Patent
Stamm et al.

(10) Patent No.: US 7,583,267 B2
(45) Date of Patent: Sep. 1, 2009

(54) STROKE CONTRAST IN FONT HINTING

(75) Inventors: Beat Stamm, Redmond, WA (US); Gregory Hitchcock, Woodinville, WA (US); Michael J. Duggan, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 144 days.

(21) Appl. No.: 11/311,946

(22) Filed: Dec. 19, 2005

(65) Prior Publication Data

US 2007/0139415 A1 Jun. 21, 2007

(51) Int. Cl.
*G06T 11/00* (2006.01)
(52) U.S. Cl. .................. 345/472; 345/467; 345/471
(58) Field of Classification Search ......... 345/467–468, 345/471, 472, 698, 469; 382/258
See application file for complete search history.

(56) References Cited

U.S. PATENT DOCUMENTS

| | | | | | |
|---|---|---|---|---|---|
| 5,068,905 | A | * | 11/1991 | Hackett et al. | 345/698 |
| 5,241,653 | A | * | 8/1993 | Collins et al. | 345/668 |
| 5,577,170 | A | * | 11/1996 | Karow | 345/467 |
| 5,579,448 | A | * | 11/1996 | Yamamoto | 358/1.11 |
| 5,586,241 | A | * | 12/1996 | Bauermeister et al. | 345/467 |
| 5,757,384 | A | * | 5/1998 | Ikeda et al. | 345/468 |
| 5,796,409 | A | * | 8/1998 | Hersch et al. | 345/468 |
| 5,929,866 | A | * | 7/1999 | Arnold | 345/471 |
| 6,151,032 | A | | 11/2000 | Cheng | |
| 6,597,360 | B1 | | 7/2003 | Stamm et al. | |
| 6,600,490 | B1 | * | 7/2003 | Brock et al. | 345/472 |
| 6,760,029 | B1 | * | 7/2004 | Phinney et al. | 345/471 |
| 7,148,893 | B2 | * | 12/2006 | Stamm et al. | 345/469 |
| 7,271,805 | B1 | * | 9/2007 | Zimmer | 345/467 |
| 2005/0219247 | A1 | | 10/2005 | Arnold et al. | |
| 2006/0017733 | A1 | * | 1/2006 | Matskewich et al. | 345/467 |
| 2007/0030272 | A1 | * | 2/2007 | Dowling et al. | 345/467 |
| 2007/0188497 | A1 | * | 8/2007 | Dowling et al. | 345/469 |
| 2007/0216689 | A1 | * | 9/2007 | Stamm et al. | 345/469 |

OTHER PUBLICATIONS

International Search Report dated Aug. 14, 2007 for Application No. PCT/US2006/045385, 7 pages.

* cited by examiner

*Primary Examiner*—Chante Harrison

(57) ABSTRACT

Stroke contrast is preserved for a range of font sizes and display resolutions using programmatic constraints or "hints". One implementation of a "font hinting" approach enforces a regularization of stroke weights such that stroke contrast is preserved for font sizes and display resolutions sufficient to render it. Font hinting instructions determine a stroke contrast threshold, which may be used to decide whether to preserve or omit stroke contrast when rendering the glyph. In one implementation, the stroke contrast threshold is based on one or more stroke contrast relationships associated with the typeface. In other implementations, the stroke contrast threshold is based on a minimum size threshold or lowercase/uppercase stroke contrast relationships.

13 Claims, 5 Drawing Sheets

STROKE CONTRAST IN FONT HINTING

BACKGROUND

Many computing systems can present information to a user by displaying text on a screen or some other media, such as a printed page. The physical characteristics of the human visual system and the various types and qualities of electronic display or print technology offer unique challenges to a type designer when developing typefaces in which the text can be presented.

In typography, a typeface consists of a coordinated set of character designs. A typeface is usually comprised of an alphabet of letters, numerals, punctuation marks, ideograms, and symbols (collectively referred to as characters or glyphs). Arial, Times New Roman, Verdana, and Georgia are four examples of typefaces. Traditionally, the word "font" denotes a complete typeface in a particular size (usually measured in points), weight (e.g., light, book, bold, black), and orientation (e.g., roman, italic, oblique). For a given typeface, each character typically corresponds to a single glyph, although certain characters of some typefaces may include multiple glyphs.

Strokes are prominent features of many glyphs. For example, a glyph representing the character 'E' may be said to include three horizontal strokes (also called "crossbars") and one vertical stroke.

In many typefaces, individual strokes may have different relative thicknesses or weights. A relationship of stroke weights is referred to as "stroke contrast". Stroke contrast can contribute to the readability and aesthetics of a typeface. One challenge to modem type designers is displaying a glyph of a given typeface in such as way as to best preserve stroke contrast for a range of font sizes and display resolutions.

SUMMARY

Implementations described and claimed herein help preserve stroke contrast for a range of font sizes and display resolutions using programmatic constraints or "hints". One implementation of a "font hinting" approach enforces a regularization of stroke weights such that stroke contrast is preserved for font sizes and display resolutions sufficient to render it. Alternatively, if the font size and display resolution are insufficient to render all needed stroke weights for a given font, some stroke weights may be equalized to accommodate these size and resolution limitations while others may still be varied to preserve at least some of the stroke contrast. Font hinting instructions determine a stroke contrast threshold, which may be used to decide whether to preserve or omit stroke contrast when rendering the glyph. In one implementation, the stroke contrast threshold is based on one or more stroke contrast relationships associated with the typeface. In another implementation, the stroke contrast threshold is based on a minimum size threshold. In yet another implementation, the stroke contrast threshold is based on lowercase/uppercase stroke contrast relationships.

In some implementations, articles of manufacture are provided as computer program products. One implementation of a computer program product provides a computer program storage medium readable by a computer system and encoding a computer program. Another implementation of a computer program product may be provided in a computer data signal embodied in a carrier wave by a computing system and encoding the computer program. Other implementations are also described and recited herein.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTIONS OF THE DRAWINGS

DETAILED DESCRIPTIONS

Scalable outline fonts are defined as continuous shapes or outlines described by coordinates, mathematical curves, and/or other parameters. Generally, glyphs may be defined by high resolution representations, of which outlines are an example. Other high resolution representations may include without limitations assorted contours, component elements, bitmaps, mathematical descriptions, and other representations.

Base outlines are described in a font definition that can be read from memory (e.g., a font file or a font cache) when an individual glyph is to be displayed or otherwise output (e.g., printed). Font definitions may be based on a Cartesian grid having x and y axes in font design units (or "font units), although other coordinate frameworks may be employed. Using such font units, a base outline of the glyph in the specified typeface may be described without regard to the displayed glyph size or the resolution of the output device.

When a glyph is to be generated, the base outline is scaled to a specified size and then used to create a discrete raster of dots (e.g., a bitmap of pixels) on a display or hardcopy output device at the specified size. If such a bitmap is made in a simplistic way, such as simply turning off each pixel or printer cell that has its center lying within the scaled outline, then a number of visually distracting artifacts can arise, such as misalignments of features and breaks in shapes (referred to as "drop-outs"). For example, if the glyph is scaled and rendered at a small size and/or to a low resolution display, the pixels turned on/off to represent the glyph will only grossly approximate the scaled outline because the resulting pixels are too large and discrete in nature to perfectly follow the scaled outline.

As such, additional processing, called "font hinting", may be employed to optimize the rendering of the glyph for a given size and display resolution. Font hinting code can be included in or associated with the font definition of each individual glyph. Font hinting provides information to the raster image processor (RIP) to enhance the rasterization of fonts. For example, font hinting may be used to distort the scaled outline so as to improve the rendering. Font hinting may be used to (1) ensure strokes intended to be equally thick appear equally thick; (2) suppress undesired overshoots (e.g., when a rounded letter, such as "O", is unintentionally scaled to appear taller than flat letters, such as "M"); (3) line up features on different glyphs that should be at the same height; (4) keep the spaces between stems open (e.g., the spaces between the vertical strokes of an "m" should be visible); (5) force consistent spacing between sets of parallel strokes; and (6) compensate for errors in the rasterization algorithm, such as errors causing drop-outs.

Figure 1:
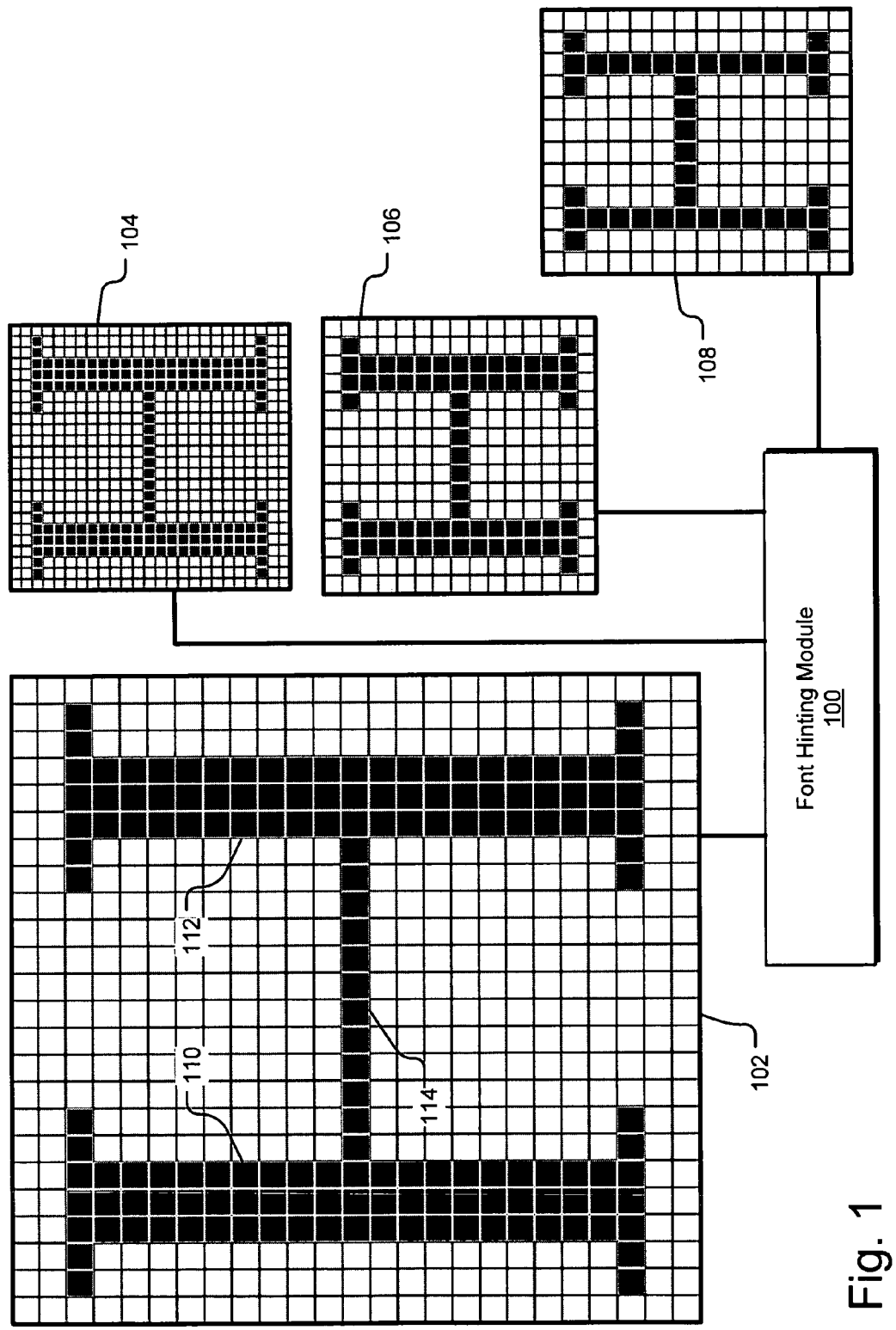
FIG. 1 illustrates an exemplary font hinting module and resulting character displays.

FIG. 1 illustrates an exemplary font hinting module 100 displays 102, 104, 106, and 108. As can be seen in character display 102, the character "H" includes two main vertical strokes 110 and 112 and one horizontal stroke 114 (also called a "crossbar"). The character in the character display 102 is displayed at a specific size and resolution and exhibits stroke contrast in that the vertical strokes 110 and 112 are thicker or have a greater stroke weight (e.g., 3 pixels) as compared to the horizontal stroke 114 (e.g., 1 pixel). The font hinting module 100 receives the scaled outline of the character "H" in the specified font and executes font hinting instructions to distort the scaled outline in order to enhance the rendering.

Character display 104 shows the character "H" at a smaller size and in a higher resolution than that of character display 102. Nevertheless, the combination of size and display resolution are capable of preserving the same stroke contrast as seen in character display 102—3 pixels in vertical strokes and 1 pixel in the horizontal stroke. The font hinting module 100 receives the scaled outline of the character "H" in the specified font and executes font hinting instructions to distort the definition to accommodate the specific size and resolution.

In contrast, character display 106 also shows a character "H" at a smaller size than character display 102, but at a lower resolution than character display 104. Based on scaling alone, certain aspects of the character would not map to the "H" shown in character display 106. Instead, vertical strokes would look taller than in character display 104, off-center in the vertical dimension, and off-center relative to the serif features, and the horizontal stroke would be off-center relative to the lengths of the vertical strokes. As such, for this combination of size and display resolution, the font hinting module 100 executes font hinting instructions to distort the definition to regularize these features and to preserve some stroke contrast by enforcing some difference in the weights of the vertical and horizontal strokes. Although the stroke contrast is not the same as with the character displays 102 and 104, it is nevertheless perceivable in character display 106, thereby maintaining the readability and the personality of the typeface.

Character display 108, however, shows a character "H" at a size similar to character displays 104 and 106, but an even lower resolution than character display 106. In this configuration, the font hinting module 100 has been unable to preserve stroke contrast, as is evident from the uniform stroke weights of the vertical and horizontal strokes.

As such, the size of the glyph and the resolution of the display can cause errors in a displayed glyph of a given font. In particular, these parameters can corrupt stroke contrast in certain fonts. Therefore, the font hinting module 100 executes font hinting instructions to distort the scaled outline of the glyph so as to preserve as much stroke contrast as possible.

Figure 2:
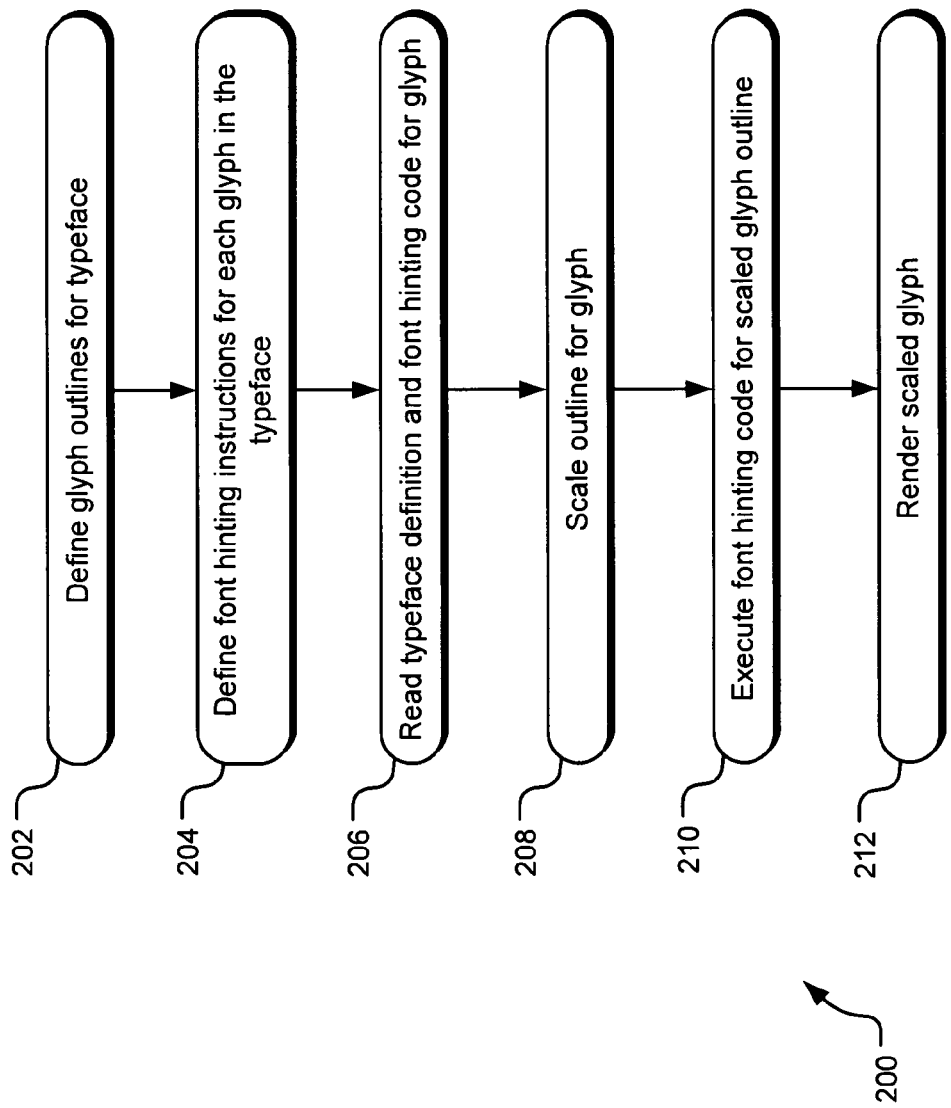
FIG. 2 illustrates exemplary operations for rendering a glyph in a given font.

FIG. 2 illustrates exemplary operations 200 for rendering a glyph in a given font. A definition operation 202 defines the typeface. As discussed, a typeface is typically defined to include a set of coordinates defining a base outline of each glyph in its character set. In some implementations, the definition of an individual glyph in a typeface may be manually defined by a typographer. In other implementations, the definition of an individual glyph may be automatically determined using a computer-implemented analysis of glyph samples or direct computerized generations of the base outline. Yet other implementations may combine both manual and computerized definition for an individual glyph or font.

Another definition operation 204 defines font hinting instructions to distort a scaled outline of the glyph for a given size and display resolution. For example, font hinting instructions can execute operations at render time to move the scaled outline of an "H" to ensure that the vertical strokes are of uniform width. In one implementation, the definition operation 204 records measurements of stroke weights in the font definitions of a given typeface (or portions thereof). These measurements can be analyzed to determine one or more stroke contrast relationships associated with the typeface.

A read operation 206 reads the font definition and font hinting code for the glyph. In one implementation, the font definition may be stored in a font library on a hard disk. Alternatively, the font definition may be cached in memory for reuse each time the glyph is rendered.

A scaling operation 208 scales the based outline specified for the glyph. In one implementation, the base outline is defined using coordinates in font units aligned with a Cartesian plane, and scaling can be accomplished using a transform on these coordinates. The scaling operation 208 may be performed by a scaling module associated with the font hinting module in an application program, an operating system, or other system of a computer or computerized device. One exemplary scaling algorithm is shown below:

$$X'_n = \frac{Size \cdot Resolution}{72 \cdot Granularity} X_n$$

where $X_n$ represents an X coordinate associated with a glyph in a font-unit-based Cartesian grid, $X_n'$ represents a corresponding scaled X coordinate associated with the glyph in a pixel coordinate system, Size represents the point size of the scaled glyph, Resolution represents the resolution of the output device, Granularity represents a granularity metric associated with the coordinate grid (i.e., an em square), in font units per em. The factor '72' reflects the number of points per inch.

An instruction operation 210 executes font hinting code on the scaled outline of the glyph. In one implementation, the scaled outline is distorted to comply with vertical and horizontal stroke widths computed by the font hinting code based on one or more stroke contrast relationships associated with the typeface, the scaled glyph size and the resolution of the display device. Details of exemplary implementations of the instruction operation 210 are provided with regard to FIG. 4. A result of the font hinting provided in the instruction operation 210 is a scaled outline exhibiting some stroke contrast, if possible in light of the scaled glyph size and the display resolution. Other aspects of the font hinting code may alter other features of the scaled glyph, including repairing drop-outs, overshoots, etc.

A rendering operation 212 generates a bitmap of the glyph based on the distorted scaled outline. For example, pixels having their centers located within the distorted scaled outline may be turned off (e.g., dark), while pixels having their centers located outside the distorted scaled outline may be turned on (e.g., light). It should be understood that the state of individual pixels may also be progressive (e.g., lighter or darker) rather than merely on or off. It is also possible to generate a bitmap using alternative rules. For example, individual pixels may be subdivided into subpixels (e.g., different color channels of a pixel), such that individual subpixels are turned on or off (or lighter or darker). The rendering operation 212 may be performed by a rendering module in an application program, an operating system, or other system of a computer or computerized device.

Figure 3:
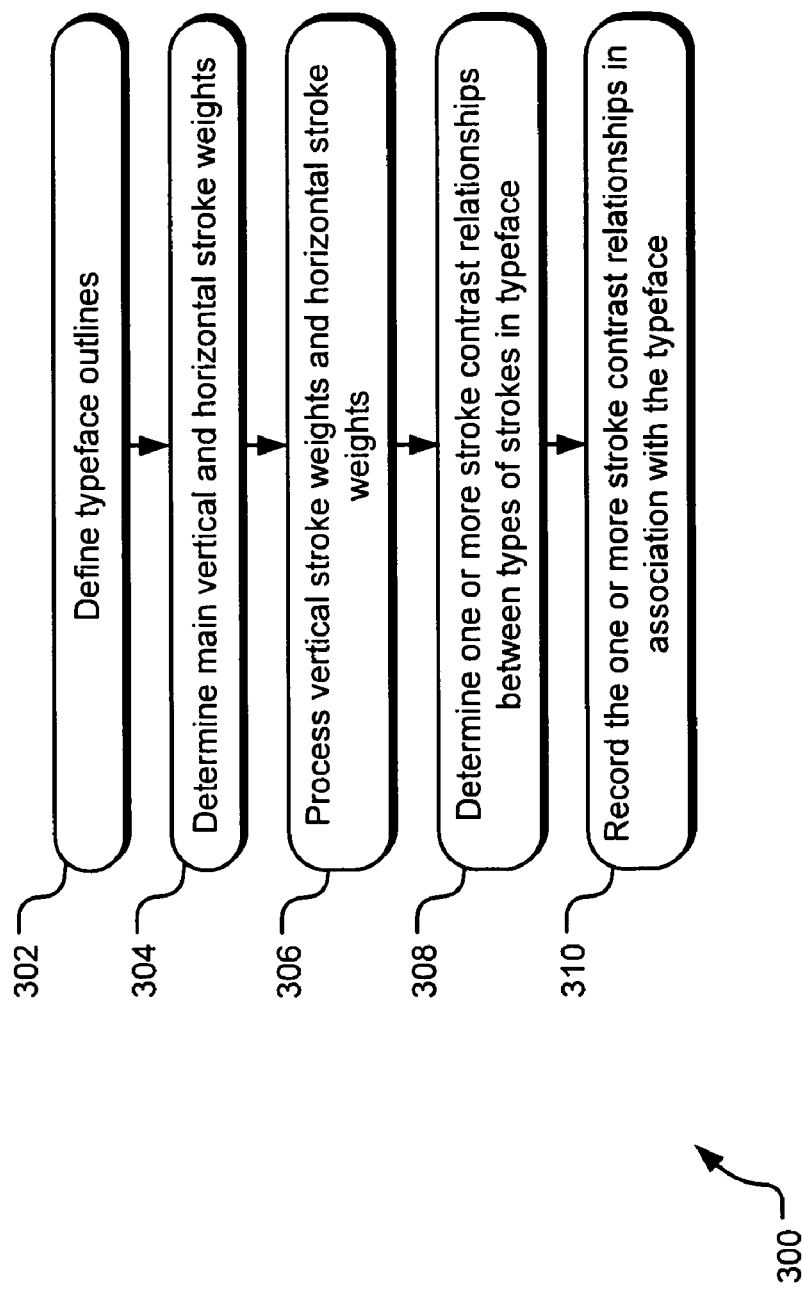
FIG. 3 illustrates exemplary operations for defining a typeface with stroke contrast preserving font hinting.

FIG. 3 illustrates exemplary operations 300 for defining a typeface with stroke contrast preserving font hinting. A definition operation 302 defines base outlines for individual glyphs of a given typeface. As discussed previously, the base outlines may be defined using coordinates, curves, and/or other parameters. In one implementation, a hand or computer drawn base outline of the glyph may be digitized into font units and stored in a font file. However, base outlines for individual glyphs may also be generated from a computerized model or image.

A weighting operation 304 determines the stroke weights (e.g., thicknesses) of vertical strokes and the stroke weights of horizontal strokes of a representative glyph or multiple glyphs in the typeface. In one implementation, in a sequence of preprocessing steps, the auto-hinter program builds up a data structure that represents the constituent parts of all strokes (vertical, horizontal, and diagonal) identified in a glyph. The auto-hinter program generates a list of segments of outlines that, according to some metric, are deemed to be straight enough to be an edge of a stroke. The auto-hinter program then identifies pairs of virtually anti-parallel edges and continuation edges (e.g. on one side of the vertical stroke on a glyph "H" the edge is "interrupted" by the cross bar) to build up a portion of the data structure representing an individual stroke. Each edge is associated with a representative control point that, according to some typographic heuristic, best describes the edge. For instance, on a mathematically perfect straight edge, only two control points are required, and either of them can serve the purpose of a representative control point. In contrast, on a slightly concave edge, for example, a control point at the locus of maximum concavity may be identified to serve said) purpose.

The distance is then determined by selecting a representative control edge on each side of the stroke, taking the Euclidean distance between the representative control points on the control edges, and projecting this distance onto a normal vector perpendicular to the principal orientation of the stroke. For example, for a stroke that is identified as a vertical stroke (oriented in y direction), the two control points used to determine the stroke weight need not be horizontally opposite to each other, so the distance is projected onto the horizontal normal (i.e., the x direction).

A computation operation 306 processes the stroke weight measurements. In one implementation, vertical stroke weights across a single typeface are averaged to yield a composite vertical stroke weight and horizontal stroke weights across the single typeface are averaged to yield a composite horizontal stroke weight. In an alternative implementation, the vertical and horizontal stroke weights from one or more reference glyphs are use to represent the composite vertical and horizontal stroke weights. In yet another alternative implementation, average vertical and horizontal stroke weights for each individual glyph may be used as composite vertical and horizontal stroke weights for that glyph.

A determination operation 308 uses the composite stroke weights to determine a stroke contrast relationship for a given typeface or for individual glyphs in the typeface. For example, in the typeface "Verdana", the main vertical strokes are designed with a weight of 198 font units while the main horizontal strokes are designed with a weight of 176 font units. Using a stroke contrast relationship that relates the thinner strokes as a percentage of the thicker strokes, the resulting stroke contrast relationship is 89%. Other forms of stroke contrast relationships may also be employed including ratios, slopes, etc. as well as relationships that relates thicker stroke weights as a percentage of thinner stroke weights. A storing operation 310 records the one or more stroke contrast relationships in association with the typeface and/or the individual glyphs of the typeface. Other parameters may also be associated with the typeface and/or the individual glyphs, including resolution thresholds, minimum size thresholds, stroke contrast relationships, etc. that may be used during font hinting.

Figure 4:
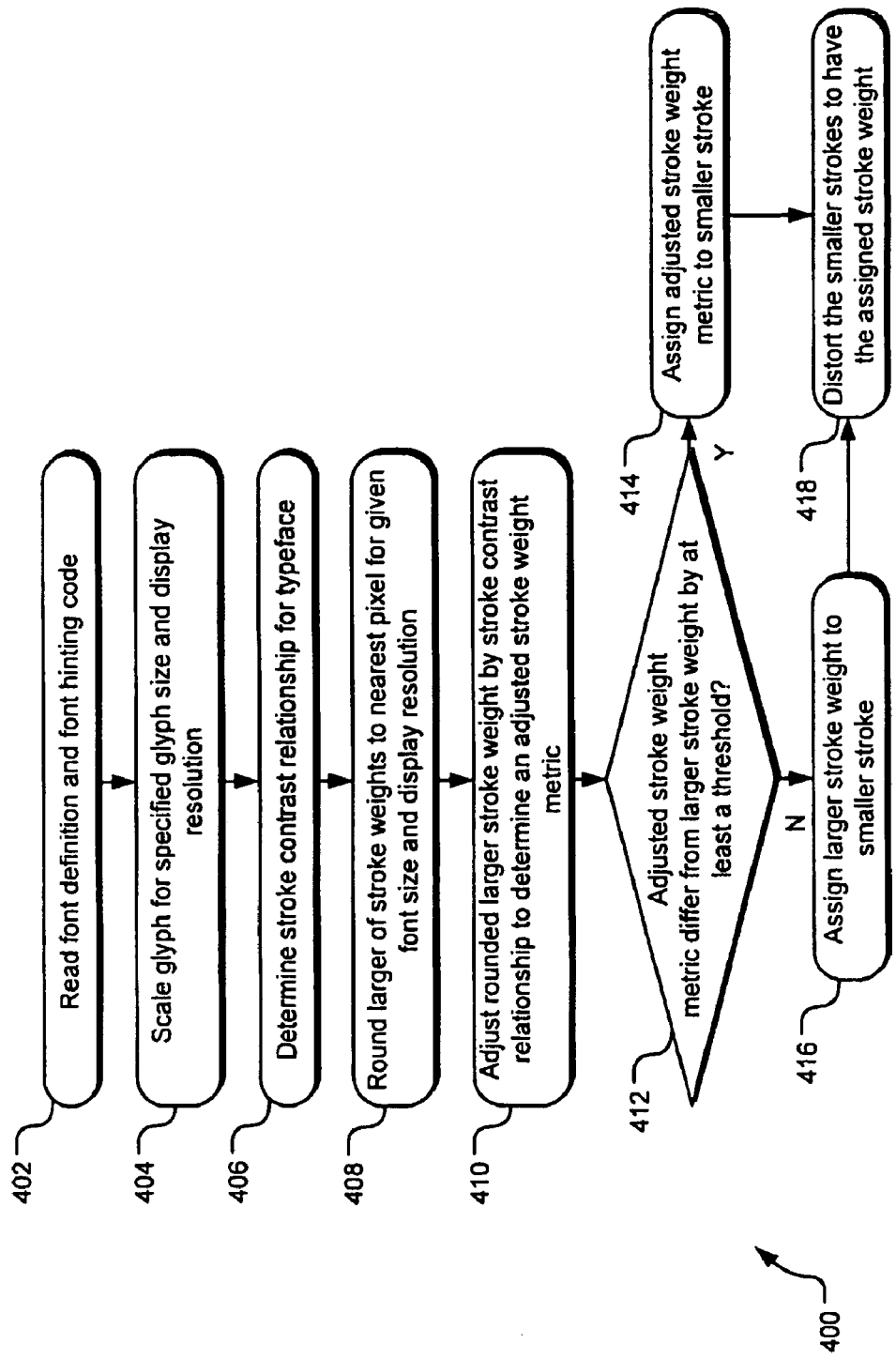
FIG. 4 illustrates exemplary operations for rendering a glyph in a font using stroke contrast preserving font hinting.

FIG. 4 illustrates exemplary operations 400 for rendering a glyph in a font using stroke contrast preserving font hinting. When a glyph is selected for output, a font definition of the base glyph outline and associated font hinting instructions and other parameters are read from a font library (or a cache) in a read operation 402. A scaling operation 404 scales the base outline based on the specified glyph size and the resolution of the display device. A determining operation 406 determines a stroke contrast relationship for the typeface.

A rounding operation 408 measures the larger of the stroke weights (i.e., vertical or horizontal) for the scaled glyph outline in pixels and rounds the measured stroke weight to the nearest pixel or some pixel-related rounding point. An adjustment operation 410 adjusts the rounded larger stroke weight by the stroke weight relationship and rounds to determine an adjusted stroke weight metric as the stroke metric threshold. For example, in one implementation, if the rounded vertical stroke weight for the glyph is 5 pixels (the thicker of the stroke weights) and the stroke contrast relationship is 89%, then the adjusted stroke weight metric is:

$$AdjustedStrokeContrastMetric = \text{round}(89\% \text{ of } 5 \text{ pixels})$$
$$= \text{round}(4.45 \text{ pixels})$$
$$= 4 \text{ pixels}$$

A decision operation 412 tests whether the scaled outline satisfies the stroke contrast threshold. For example, as shown in FIG. 4, the scaled outline satisfies the stroke contrast threshold if the adjusted stroke weight metric differs from the larger stroke weight by at least a specified resolution threshold, such as one pixel. The decision operation 412 effectively identifies which side of a stroke contrast threshold the glyph resides. On one side of the stroke contrast threshold, the stroke contrast is preserved; on the other side of the stroke contrast threshold, the stroke contrast is omitted.

In the case of the example above, which has a specified resolution threshold of one pixel, the adjusted stroke weight metric of four pixels does differ from the larger stroke weight (five pixels) by at least one pixel (an exemplary resolution threshold). Therefore, the stroke contrast threshold is satisfied, and an assignment operation 414 assigns the adjusted stroke weight metric to the smaller stroke weight of the glyph, thereby preserving stroke contrast. Otherwise, if the adjusted stroke weight metric does not differ from the larger stroke weight by at least one pixel, such as in the situation described below:

$$AdjustedStrokeContrastMetric = \text{round}(91\% \text{ of } 5 \text{ pixels})$$
$$= \text{round}(4.55 \text{ pixels})$$
$$= 5 \text{ pixels}$$

then the stroke contrast threshold is not satisfied, and another assignment operation 416 assigns the larger stroke weight to the smaller stroke of the glyph, thereby sacrificing stroke contrast.

A font hinting operation 418 distorts the scaled outline of the smaller stroke to have the assigned stroke weight. If the adjusted stroke weight metric is assigned (e.g., in the assignment operation 414), then the smaller stroke exhibits contrast with the larger stroke by at least the resolution threshold, based on this distortion. In contrast, if the larger stroke weight is assigned (e.g., in the assignment operation 416), then the smaller stroke does not exhibit contrast with the larger stroke, based on this distortion.

Stroke contrast thresholds may be determined using a variety of different methods, such as the adjusted stroke contrast metric approach described above. In one alternative implementation, a stroke contrast threshold is based on a minimum size threshold (such as a minimum pixel-per-em threshold). If the scaled glyph is sized at or above the minimum size threshold, stroke contrast will be preserved. In some typographical applications, a pixel-per-em size can represent a tangible characteristic of the output device environment. For example, 42 pixels-per-em corresponds to 10 point on a 300 dots-per-inch (dpi) output device (e.g., laser or inkjet printer), which represents both a typical text font size and a typical resolution of a low end output device. Therefore, a typographical engineer may set a minimum size threshold of 42 pixels-per-em for such an output device, for example, such that any glyph to be rendered to satisfy the minimum size threshold (e.g., to be at or above the minimum size threshold) is rendered to preserve stroke contrast (e.g., such as by using an assignment operation 414). In contrast, any glyph to be rendered so as not to satisfy the minimum size threshold (e.g., to be below the minimum size threshold) is rendered to omit stroke contrast (e.g., such as by using an assignment operation 416).

In yet another implementation, stroke contrasts between strokes of uppercase and lowercase characters may be controlled. For some typefaces, a main vertical stroke of an uppercase character may be greater than a main vertical stroke of a corresponding lowercase character. For example, in Verdana, the uppercase main vertical stroke of a character is designed to have a weight of 198 font units, whereas the lowercase main vertical stroke of the same character is designed to have a weight of 188 font units, presenting an uppercase/lowercase stroke contrast relationship of 95%.

In certain output contexts, the uppercase main strokes may satisfy the stroke contrast threshold at a lower pixel-per-em than the lowercase main strokes, resulting in uppercase characters that exhibit stroke contrast at a certain size/resolution conditions but lowercase characters that do not exhibit stroke contrast at the same size/resolution conditions. This circumstance can result in an unintended and distracting effect in which uppercase characters appear distinctly thicker or bolder than lowercase characters.

Accordingly, in this implementation, the stroke contrast threshold is determined based on an uppercase/lowercase stroke contrast relationship. If the scaled outline of the glyph satisfies the stroke contrast threshold (e.g., using a test similar to the one described with regard to the decision operation 412; a minimum pixel-per-em size, or some other method), then the scaled glyph is rendered to preserve stroke contrast (e.g., such as by using an assignment operation 414) for both uppercase and lowercase characters. In contrast, if the scaled glyph does not satisfy the stroke contrast threshold, then the scaled glyph is rendered to omit stroke contrast but maintain consistency between uppercase and lowercase characters. Accordingly, in this case, composite vertical and horizontal stroke weights are computed between the uppercase characters and the lowercase characters in the typeface, and the composite vertical stroke weight is applied to vertical strokes of both uppercase and lowercase characters and the composite horizontal stroke weight is applied to horizontal strokes of both uppercase and lowercase characters. It should be understood that composite stroke weights may be computed in a variety of ways, including averaging uppercase and lower case stroke weights, prorating uppercase and lowercase stroke weights, etc.

Figure 5:
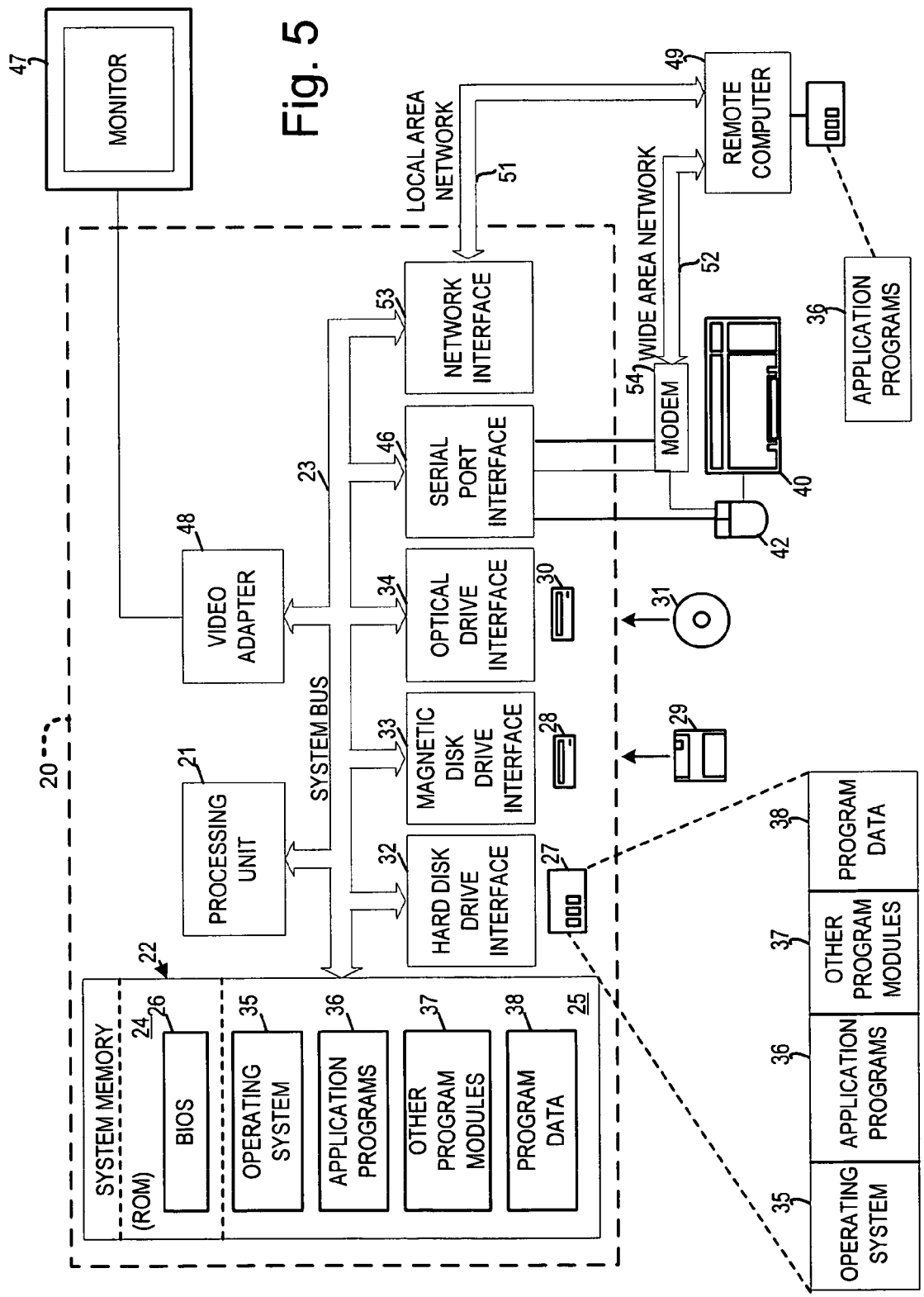
FIG. 5 illustrates an exemplary system that may be useful in implementing the described technology.

The exemplary hardware and operating environment of FIG. 5 for implementing the invention includes a general purpose computing device in the form of a computer 20, including a processing unit 21, a system memory 22, and a system bus 23 that operatively couples various system components including the system memory to the processing unit 21. There may be only one or there may be more than one processing unit 21, such that the processor of computer 20 comprises a single central-processing unit (CPU), or a plurality of processing units, commonly referred to as a parallel processing environment. The computer 20 may be a conventional computer, a distributed computer, or any other type of computer; the invention is not so limited.

The system bus 23 may be any of several types of bus structures including a memory bus or memory controller, a peripheral bus, a switched fabric, point-to-point connections, and a local bus using any of a variety of bus architectures. The system memory may also be referred to as simply the memory, and includes read only memory (ROM) 24 and random access memory (RAM) 25. A basic input/output system (BIOS) 26, containing the basic routines that help to transfer information between elements within the computer 20, such as during start-up, is stored in ROM 24. The computer 20 further includes a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD ROM or other optical media.

The hard disk drive 27, magnetic disk drive 28, and optical disk drive 30 are connected to the system bus 23 by a hard disk drive interface 32, a magnetic disk drive interface 33, and an optical disk drive interface 34, respectively. The drives and their associated computer-readable media provide nonvolatile storage of computer-readable instructions, data structures, program modules and other data for the computer 20. It should be appreciated by those skilled in the art that any type of computer-readable media which can store data that is accessible by a computer, such as magnetic cassettes, flash memory cards, digital video disks, random access memories (RAMs), read only memories (ROMs), and the like, may be used in the exemplary operating environment.

A number of program modules may be stored on the hard disk, magnetic disk 29, optical disk 31, ROM 24, or RAM 25, including an operating system 35, one or more application programs 36, other program modules 37, and program data 38. A user may enter commands and information into the personal computer 20 through input devices such as a keyboard 40 and pointing device 42. Other input devices (not shown) may include a microphone, joystick, game pad, satellite dish, scanner, or the like. These and other input devices are often connected to the processing unit 21 through a serial port interface 46 that is coupled to the system bus, but may be connected by other interfaces, such as a parallel port, game port, or a universal serial bus (USB). A monitor 47 or other type of display device is also connected to the system bus 23 via an interface, such as a video adapter 48. In addition to the monitor, computers typically include other peripheral output devices (not shown), such as speakers and printers.

The computer 20 may operate in a networked environment using logical connections to one or more remote computers, such as remote computer 49. These logical connections are achieved by a communication device coupled to or a part of the computer 20; the invention is not limited to a particular type of communications device. The remote computer 49 may be another computer, a server, a router, a network PC, a client, a peer device or other common network node, and typically includes many or all of the elements described above relative to the computer 20, although only a memory storage device 50 has been illustrated in FIG. 5. The logical connections depicted in FIG. 5 include a local-area network (LAN) 51 and a wide-area network (WAN) 52. Such networking environments are commonplace in office networks, enterprise-wide computer networks, intranets and the Internet, which are all types of networks.

When used in a LAN-networking environment, the computer 20 is connected to the local network 51 through a network interface or adapter 53, which is one type of communications device. When used in a WAN-networking environment, the computer 20 typically includes a modem 54, a network adapter, a type of communications device, or any other type of communications device for establishing communications over the wide area network 52. The modem 54, which may be internal or external, is connected to the system bus 23 via the serial port interface 46. In a networked environment, program modules depicted relative to the personal computer 20, or portions thereof, may be stored in the remote memory storage device. It is appreciated that the network connections shown are exemplary and other means of and communications devices for establishing a communications link between the computers may be used.

In an exemplary implementation, a scaling module, a font hinting module, a rendering module and other modules may be embodied by instructions stored in memory 404 and//or storage devices 408 and 410 and processed by the processing unit 402. Font definitions, font hinting code, stroke contrast relationships, resolution thresholds, minimum size thresholds, stroke contrast thresholds, scaled font outlines, rendered bitmaps, and other data may be stored in memory 404 and/or storage devices 408 and 410.

The technology described herein is implemented as logical operations and/or modules in one or more systems. The logical operations may be implemented as a sequence of processor-implemented steps executing in one or more computer systems and as interconnected machine or circuit modules within one or more computer systems. Likewise, the descriptions of various component modules may be provided in terms of operations executed or effected by the modules. The resulting implementation is a matter of choice, dependent on the performance requirements of the underlying system implementing the described technology. Accordingly, the logical operations making up the embodiments of the technology described herein are referred to variously as operations, steps, objects, or modules. Furthermore, it should be understood that logical operations may be performed in any order, unless explicitly claimed otherwise or a specific order is inherently necessitated by the claim language.

The above specification, examples and data provide a complete description of the structure and use of exemplary embodiments of the invention. Although various embodiments of the invention have been described above with a certain degree of particularity, or with reference to one or more individual embodiments, those skilled in the art could make numerous alterations to the disclosed embodiments without departing from the spirit or scope of this invention. In particular, it should be understood that the described technology may be employed independent of a personal computer. Other embodiments are therefore contemplated. It is intended that all matter contained in the above description and shown in the accompanying drawings shall be interpreted as illustrative only of particular embodiments and not limiting. Changes in detail or structure may be made without departing from the basic elements of the invention as defined in the following claims.

Although the subject matter has been described in language specific to structural features and/or methodological arts, it is to be understood that the subject matter defined in the appended claims is not necessarily limited to the specific features or acts descried above. Rather, the specific features and acts described above are disclosed as example forms of implementing the claimed subject matter.

What is claimed is:

1. A method of controlling stroke contrast in a glyph of a typeface for presentation at a specified glyph size by an output device having a display resolution, wherein the glyph has a defined base representation, the method comprising: using a processing unit coupled to a memory;

scaling the base representation of the glyph in accordance with the specified glyph size and the display resolution;

determining a stroke contrast threshold based on the specified glyph size and the display resolution, determining the stroke contrast threshold comprising:

determining a stroke contrast relationship associated with the typeface;

selecting a larger stroke weight of either a vertical stroke weight of the scaled representation of the glyph or a horizontal stroke weight of the scaled representation of the glyph;

rounding the larger stroke weight to a nearest pixel-related rounding point; and adjusting the rounded larger stroke weight based on the stroke contrast relationship to produce an adjusted stroke weight metric as the stroke contrast threshold;

distorting the scaled representation to preserve the stroke contrast in the glyph, if the scaled representation of the glyph satisfies the stroke contrast threshold;

distorting the scaled representation to omit the stroke contrast in the glyph, if the scaled representation of the glyph does not satisfy the stroke contrast threshold; and determining a stroke contrast relationship associated with the typeface, wherein the stroke contrast threshold is based on the stroke contrast relationship, and wherein the stroke contrast relationship relates a vertical stroke weight of the base representation of the glyph to a horizontal stroke weight of the base representation of the glyph, wherein the scaled representation of the glyph is determined to satisfy the stroke contrast threshold if the adjusted stroke weight metric differs from the rounded larger stroke weight by at least a resolution threshold.

2. The method of claim 1 wherein the operation of distorting the scaled representation to preserve the stroke contrast in the glyph comprises:

selecting a stroke of the glyph having a smaller stroke weight of either a vertical stroke weight of the scaled representation of the glyph or a horizontal stroke weight of the scaled representation of the glyph; and distorting the selected stroke to have a stroke weight of the adjusted stroke weight metric.

3. A method of controlling stroke contrast in a glyph of a typeface for presentation at a specified glyph size by an output device having a display resolution, wherein the glyph has a defined base representation, the method comprising: using a processing unit coupled to a memory;

scaling the base representation of the glyph in accordance with the specified glyph size and the display resolution;

determining a stroke contrast threshold based on the specified glyph size and the display resolution, determining the stroke contrast threshold comprising:

determining a stroke contrast relationship associated with the typeface;

selecting a larger stroke weight of either a vertical stroke weight of the scaled representation of the glyph or a horizontal stroke weight of the scaled representation of the glyph;

rounding the larger stroke weight to a nearest pixel-related rounding point; and adjusting the rounded larger stroke weight based on the stroke contrast relationship to produce an adjusted stroke weight metric as the stroke contrast threshold;

distorting the scaled representation to preserve the stroke contrast in the glyph, if the scaled representation of the glyph satisfies the stroke contrast threshold;

distorting the scaled representation to omit the stroke contrast in the glyph, if the scaled representation of the glyph does not satisfy the stroke contrast threshold; and determining a stroke contrast relationship associated with the typeface, wherein the stroke contrast threshold is based on the stroke contrast relationship, and wherein the stroke contrast relationship relates a vertical stroke weight of the base representation of the glyph to a horizontal stroke weight of the base representation of the glyph, wherein the scaled representation of the glyph is determined to not satisfy the stroke contrast threshold if the adjusted stroke weight metric does not differ from the rounded larger stroke weight by at least a resolution threshold.

4. The method of claim 3 wherein the operation of distorting the scaled representation to omit the stroke contrast in the glyph comprises:

selecting a stroke of the glyph having a smaller stroke weight of either a vertical stroke weight of the scaled representation of the glyph or a horizontal stroke weight of the scaled representation of the glyph; and distorting the selected stroke to have a stroke weight of the larger stroke weight.

5. The method of claim 3 further comprising:
rendering the glyph for the output device.

6. The method of claim 3 further comprising:
determining a minimum size threshold associated with the typeface, wherein the stroke contrast threshold is based on the minimum size threshold.

7. The method of claim 3 further comprising:
determining a stroke contrast relationship relating the stroke weights of uppercase characters of the typeface to lowercase characters of the typeface, wherein the stroke contrast threshold is based on the stroke contrast relationship.

8. The method of claim 7 wherein the stroke contrast relationship relates a stroke weight of the base representation of an uppercase version of the glyph to a stroke weight of the base representation of a lowercase version of the glyph.

9. A method of controlling stroke contrast in a glyph of a typeface for presentation at a specified glyph size by an output device having a display resolution, wherein the glyph has a defined base representation, the method comprising: using a processing unit coupled to a memory;

scaling the base representation of the glyph in accordance with the specified glyph size and the display resolution;

determining a stroke contrast threshold based on the specified glyph size and the display resolution, wherein determining the stroke contrast threshold comprises:

determining a stroke contrast relationship relating the stroke weights of uppercase characters of the typeface to the stroke weights of lowercase characters of the typeface;

selecting a larger character stroke weight of either a vertical character stroke weight of the scaled representation of the glyph or a horizontal character stroke weight of the scaled representation of the glyph;

rounding the larger stroke weight to a nearest pixel-related rounding point; and adjusting the rounded larger stroke weight based on the stroke contrast relationship to produce an adjusted stroke weight metric as the stroke contrast threshold;

distorting the scaled representation to preserve the stroke contrast in the glyph, if the scaled representation of the glyph satisfies the stroke contrast threshold;

distorting the scaled representation to omit the stroke contrast in the glyph, if the scaled representation of the glyph does not satisfy the stroke contrast threshold; and determining a stroke contrast relationship associated with the typeface, wherein the stroke contrast threshold is based on the stroke contrast relationship, and wherein the stroke contrast relationship relates a vertical stroke weight of the base representation of the glyph to a horizontal stroke weight of the base representation of the glyph, wherein the scaled representation of the glyph is determined to satisfy the stroke contrast threshold if the adjusted stroke weight metric differs from the rounded larger stroke weight by at least a resolution threshold.

10. The method of claim 9 wherein the operation of distorting the scaled representation to preserve the stroke contrast in the glyph comprises:

selecting a stroke of the glyph having a smaller stroke weight of either a vertical stroke weight of the scaled representation of the glyph or a horizontal stroke weight of the scaled representation of the glyph; and distorting the selected stroke to have a stroke weight of the adjusted stroke weight metric.

11. A method of controlling stroke contrast in a glyph of a typeface for presentation at a specified glyph size by an output device having a display resolution, wherein the glyph has a defined base representation, the method comprising: using a processing unit coupled to a memory;

scaling the base representation of the glyph in accordance with the specified glyph size and the display resolution;

determining a stroke contrast threshold based on the specified glyph size and the display resolution, wherein determining the stroke contrast threshold comprises:

determining a stroke contrast relationship relating the stroke weights of uppercase characters of the typeface to the stroke weights of lowercase characters of the typeface;

selecting a larger character stroke weight of either a vertical character stroke weight of the scaled representation of the glyph or a horizontal character stroke weight of the scaled representation of the glyph;

rounding the larger stroke weight to a nearest pixel-related rounding point; and adjusting the rounded larger stroke weight based on the stroke contrast relationship to produce an adjusted stroke weight metric as the stroke contrast threshold;

distorting the scaled representation to preserve the stroke contrast in the glyph, if the scaled representation of the glyph satisfies the stroke contrast threshold;

distorting the scaled representation to omit the stroke contrast in the glyph, if the scaled representation of the glyph does not satisfy the stroke contrast threshold; and determining a stroke contrast relationship associated with the typeface, wherein the stroke contrast threshold is based on the stroke contrast relationship, and wherein the stroke contrast relationship relates a vertical stroke weight of the base representation of the glyph to a horizontal stroke weight of the base representation of the glyph, wherein the scaled representation of the glyph is determined to not satisfy the stroke contrast threshold if the adjusted stroke weight metric does not differ from the rounded larger stroke weight by at least a resolution threshold.

12. The method of claim 11 wherein the operation of distorting the scaled representation to omit the stroke contrast in the glyph comprises:

computing a composite stroke weight based on both a stroke weight of the scaled representation of an uppercase version of the glyph and a stroke weight of the scaled representation of a lowercase version of the glyph; and distorting strokes of both the scaled representation of the uppercase version of the glyph and the scaled representation of the lowercase version of the glyph to have the composite stroke weight.

13. The method of claim 12 wherein the operation of computing a composite stroke weight comprises:

averaging the stroke weight of the scaled representation of the uppercase version of the glyph and the stroke weight of the scaled representation of the lowercase version of the glyph.

* * * * *